US009267754B2

(12) United States Patent
Liljeholm

(10) Patent No.: US 9,267,754 B2
(45) Date of Patent: Feb. 23, 2016

(54) TRAINING WEAPON SYSTEM FOR RECOILLESS ANTITANK RIFLE WEAPONS

(75) Inventor: Johnny Liljeholm, Eskilstuna (SE)

(73) Assignee: SAAB AB, Linköping (SE)

( * ) Notice: Subject to any disclaimer, the term of this patent is extended or adjusted under 35 U.S.C. 154(b) by 568 days.

(21) Appl. No.: 13/697,444

(22) PCT Filed: May 11, 2010

(86) PCT No.: PCT/SE2010/000131
§ 371 (c)(1),
(2), (4) Date: Apr. 23, 2013

(87) PCT Pub. No.: WO2011/142695
PCT Pub. Date: Nov. 17, 2011

(65) Prior Publication Data
US 2013/0280677 A1 Oct. 24, 2013

(51) Int. Cl.
*F41A 33/00* (2006.01)
*F41A 21/10* (2006.01)
*F41F 3/045* (2006.01)
*G09B 25/00* (2006.01)

(52) U.S. Cl.
CPC ................. *F41A 33/00* (2013.01); *F41A 21/10* (2013.01); *F41F 3/045* (2013.01); *G09B 25/00* (2013.01)

(58) Field of Classification Search
CPC .............. F41A 1/00; F41A 33/00; F41F 1/00; F41C 3/00; G09B 25/00; F41G 3/26; F41G 3/32
USPC .............................. 434/16; 89/1.14, 1.7, 161
See application file for complete search history.

(56) References Cited

U.S. PATENT DOCUMENTS 3,296,928 A 1/1967 Lübbers
4,983,123 A * 1/1991 Scott et al. ...................... 434/21
5,811,715 A 9/1998 Åsbrink
6,145,440 A * 11/2000 Franzen ........................ 102/446
7,681,483 B1 3/2010 Rhoades et al.

FOREIGN PATENT DOCUMENTS

RU 2272238 C1 3/2006
SE 511197 C2 8/1999
WO WO-2009/055820 A2 4/2009

OTHER PUBLICATIONS

International Search Report issued Jan. 3, 2011 in corresponding Application No. PCT/SE2010/000131.

* cited by examiner

*Primary Examiner* — Sam Yao
*Assistant Examiner* — Jennifer Fassett
(74) *Attorney, Agent, or Firm* — Novak Druce Connolly Bove + Quigg LLP

(57) ABSTRACT

The invention relates to a training weapon system (1) intended for a recoilless antitank rifle (2), the training weapon system (1) comprising a sub-caliber barrel (3) for firing sub-caliber practice projectiles (4) provided with base plates (5), the sub-caliber barrel (3) being arranged in a shell-like body (6) in the barrel (7) of the recoilless antitank rifle (2), the front part of the sub-caliber barrel (3) being fitted in a guide part (8) for centering the barrel (3), and a rear part of the barrel (3) being fitted in a breech (9), comprising a firing channel (10) and a nozzle screw thread (11) for fitting a nozzle screw (12), which is arranged in the rear part of the shell-like body (6). The invention is characterized in that the training weapon system (1) comprises at least one locking part (13, 14), the function of which is to prevent the nozzle screw (12) or the base plate (5) of the projectile (4) or part of the base plate (5) being expelled backwards through the nozzle funnel (21) of the antitank rifle (2) as loose flying projectiles.

7 Claims, 2 Drawing Sheets

Figure 1:
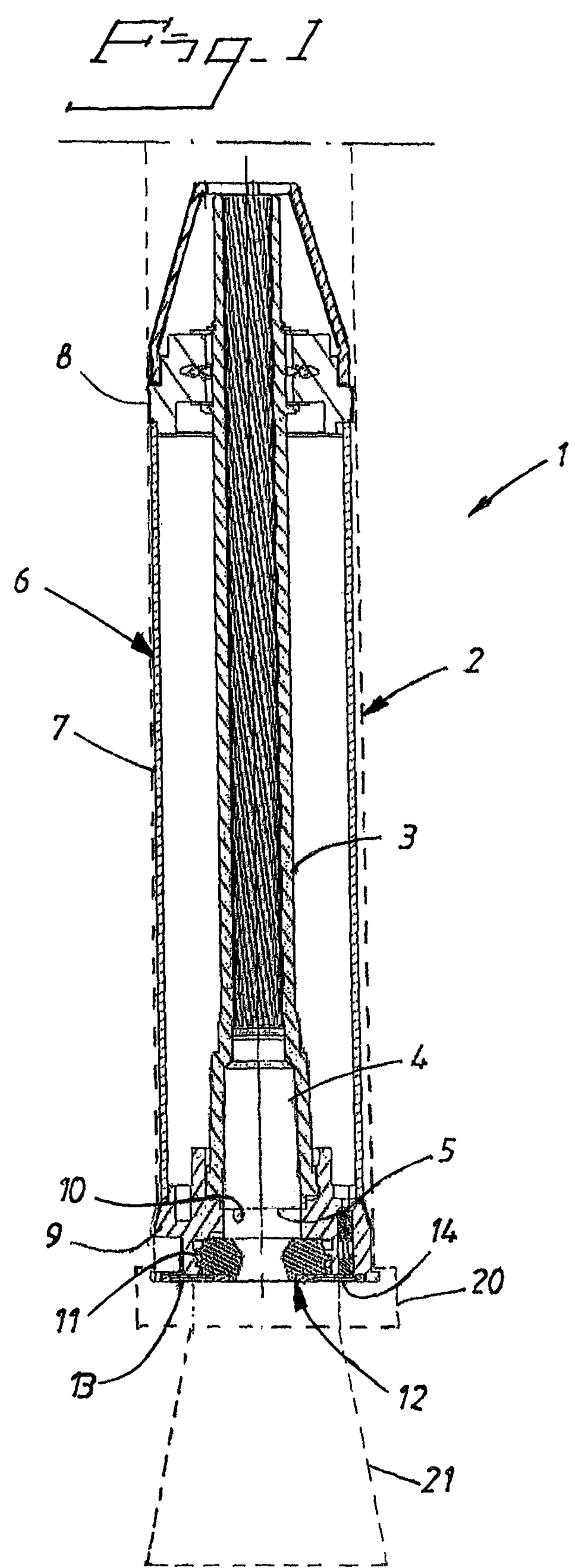

15
16
14
12
17
19
11
5
13
10
18
9

1
2
3
4
5
6
7
8
9
10
11
12
13
14
20
21

TRAINING WEAPON SYSTEM FOR RECOILLESS ANTITANK RIFLE WEAPONS

CROSS REFERENCE TO RELATED APPLICATIONS

This application is a National Phase filing under 35 U.S.C. §371 of PCT/SE2010/000131 filed on May 11, 2010, the entire contents of which are hereby incorporated by reference.

The present invention relates to a training weapon system for recoilless antitank rifle weapons, comprising a sub-calibre barrel arranged in the barrel of the antitank rifle. The invention is intended especially for man-portable recoilless antitank rifles of the Carl Gustav (CG) 84 mm type or for man-portable antitank grenade launchers of single-use type.

BACKGROUND OF THE INVENTION

Training weapon systems for recoilless antitank rifles of said type are already known. The training systems are designed to allow practice firing under the most realistic training conditions possible without the need to fire full-calibre rounds.

The training systems are based on the principle of arranging or incorporating a sub-calibre barrel or a so-called adapter insert into the barrel of the recoilless antitank rifle weapon for firing projectiles of smaller calibre than the live weapon.

A training weapon system of said type has been developed for the Carl Gustav antitank rifle and is based on a 20-mm calibre adapter system. The training weapon system described in the patent specification SE 511197 is designed for the absence of any recoil, which means that the training weapon generates a backblast effect comparable to that generated by the full-calibre weapon. The 20 mm calibre is entirely adequate for producing realistic sound levels of approximately 170 dB in practice firing, compared to approximately 180 dB in the case of full-calibre firing.

The adapter system comprises a barrel for sub-calibre projectiles fitted in a shell-like body, externally similar to 84 mm CG ammunition. The barrel is fitted in the shell-like body with a front guide for centring the barrel and a breech comprising a firing channel for a firing device and a nozzle screw thread for fitting a nozzle screw.

After loading the training weapon with 20 mm ammunition, attaching a firing device, fitting the nozzle screw and closing the end piece of the weapon, practice firing can be commenced.

One problem with said training weapons is that with repeated firing the nozzle screw thread is affected by leaking hot propellant gases, which expand under high pressure in the combustion chamber of the weapon, with the result that the gases not only erode the nozzle screw thread, thereby reducing its solidity, but also erode the nozzle aperture of the nozzle screw, which affects the performance of the weapon.

After an unknown number of firings the solidity in the nozzle thread will have been reduced to a level at which there is a risk of the nozzle screw becoming detached and expelled backwards through the nozzle aperture of the end piece as a projectile, which constitutes a risk to persons in the surrounding area. The service life of the nozzle screw depends on the number of rounds fired and can be difficult to estimate. Visual inspection, interpretation of the threads and the nozzle aperture, involves some uncertainty and does not eliminate the risk that the nozzle screw may fly off in the event of a fracture in the threaded fastening of the nozzle screw. If several different types of ammunition with different chamber pressures are incorporated into 20 mm training systems, it may be difficult to assess the service life in terms of the number of rounds.

In order to prevent the erosive effect of the gases on the threaded fastening and thereby to eliminate the risk of thread fracture, a ventilation hole has been made in the circumferential surface of the breech, in order to vent the propellant gases.

However, the ventilation hole has proved inadequate for venting the propellant gases, partly due to the fact that the hole cannot be made large enough, since too large a hole has a detrimental effect on the performance of the weapon, and partly due to the fact that solid products of combustion soon clog up the hole, thereby entirely preventing any ventilation.

Another problem that has been observed with said training weapons is that the training weapon can be fired without the nozzle screw having been fitted in the breech.

Firing with the training weapon without the nozzle screw fitted means that the ammunition, when fired, will stick in the barrel, so that excessive back-pressure is formed, which causes the base plate of the ammunition to splinter and fly backwards through the nozzle opening of the end piece. Loose flying splinters behind the training weapon constitute a risk to persons in the surrounding area.

OBJECT AND CHARACTERISTICS OF THE INVENTION

A principal aim of the present invention is to provide an improved training weapon system, which effectively prevents loose flying parts or splinters behind the training weapon.

Said aim and other objects not enumerated here are satisfactorily met by the specifications of the present independent patent claims. Embodiments of the invention are specified in the dependent claims.

The present invention, therefore, provides a training weapon system, which is intended for a recoilless antitank rifle, the training weapon system comprising a sub-calibre barrel for firing sub-calibre practice projectiles provided with base plates, the barrel being arranged in a shell-like body in the barrel of the recoilless antitank rifle, the front part of the barrel being fitted in a guide part for centring the barrel, and a rear part of the barrel being fitted in a breech, comprising a firing channel and a nozzle screw thread for fitting a nozzle screw, which is arranged in the rear part of the shell-like body.

The training weapon system is characterized in that the training weapon system comprises at least one locking part, the function of which is to prevent the nozzle screw or the base plate of the projectile or part of the base plate being expelled backwards through the nozzle funnel of the antitank rifle as loose flying projectiles.

According to further aspects of the primer screw, according to the invention:

the locking part comprises a flange arranged on the nozzle screw and said flange is designed, in the event of a fracture in the nozzle screw thread, to prevent the nozzle screw leaving the nozzle screw thread and being expelled backwards through the nozzle funnel of the antitank rifle as a loose flying projectile, the flange is designed with an outside diameter which is greater than the inlet diameter to the nozzle funnel of the antitank rifle, in order thereby to prevent the passage of the nozzle screw, the rear plane of the breech comprises a countersunk depression, the shape of which corresponds to the shape of the flange, the locking part comprises a safety catch, which is arranged in the breech, the safety catch being designed to prevent closing of the end piece of the antitank rifle when the nozzle screw has not been fitted, in order to prevent firing of the training weapon and hence the associated formation of loose flying splinters from the base plate of the projectile due to the excessively high back pressure, the safety catch comprises a pre-tensioned cotter, the cotter being pre-tensioned by a spring and moveably arranged in a cylindrical housing countersunk in the rear plane of the breech.

ADVANTAGES AND EFFECTS OF THE INVENTION

The invention affords a number of advantages and effects:

The improved training weapon with built-in safety catch and modified nozzle screw affords a new safety concept with simplified handling. The number of checks on the fastening of the nozzle screw, and to ensure that the nozzle screw is fitted before firing can proceed, can be greatly reduced.

The flange of the nozzle screw effectively prevents the nozzle screw becoming detached in the event of a fracture in the threaded fastening and being expelled backwards through the end piece of the antitank rifle. No ventilation hole is needed for the venting of propellant gases.

The diameter of the flange makes it impossible for the nozzle screw to pass through the nozzle aperture of the end piece.

The end piece of the training weapon can easily be used as a stay for the flange without the need for any modifications to the end piece.

Use of the new nozzle screw obviates the need for any further modifications of the training weapon.

The safe distance behind the training weapon can be greatly reduced.

Figure 2:
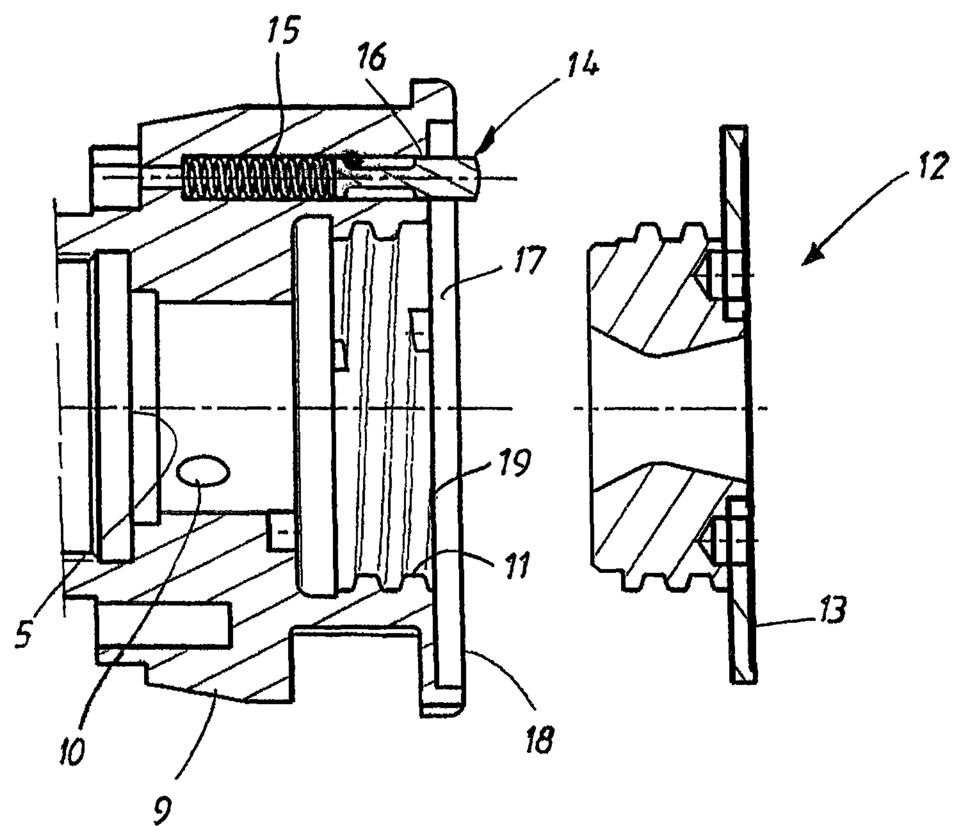

Further advantages and effects of the invention will be apparent from a study and consideration of the following detailed description of the invention, whilst referring to the figures of the drawing, of which:

FIG. 1 schematically shows a longitudinal section through a shell-like ammunition unit of the Carl Gustav type with a nozzle screw fitted in the breech of the ammunition unit, FIG. 2 shows an enlargement of the rear part of the ammunition unit according to FIG. 1, in which the nozzle screw has not been fitted in the breech of the ammunition unit.

DETAILED DESCRIPTION OF EMBODIMENTS

FIG. 1 shows a training weapon system 1 specially intended for recoilless antitank rifles 2 of the Carl Gustav type. The training weapon system 1 comprises a sub-calibre barrel 3 for practice projectiles 4, preferably of 20 mm calibre. Barrels of other calibres may also be used. The barrel 3 is fitted in a shell-like ammunition unit 6 in barrel 7 via a front guide 8 for centring the barrel 3, and via a breech 9 comprising a firing channel 10 and a nozzle screw thread 11 for fitting a nozzle screw 12. The rear part of the barrel 3 comprises an ammunition space for a 20 mm practice projectile 4 provided with a base plate 5.

FIG. 2 shows a partial enlargement of the breech 9 and the nozzle screw 12 in FIG. 1, the nozzle screw 12 being shown separated from the breech 9 in a non-fitted state. The nozzle screw 12 comprises a flange 13, the function of which is to prevent the nozzle screw 12, in the event of a fracture in the nozzle screw thread 11, becoming detached and being expelled backwards through the end piece 20 of the antitank rifle 2 and the nozzle funnel 21, indicated by dashed lines in FIG. 1.

The larger diameter of the flange 13 makes it impossible for the nozzle screw 12 to pass through the nozzle aperture of the end piece 20, which prevents the nozzle screw 12 forming a loose flying projectile.

The flange 13 is preferably circular with a discus-like shape and covers the major part of the rear plane 18 of the breech 9. The flange 13 may also take some other form, such as a square-shaped plate, for example. A countersunk depression 17, corresponding in shape and size to the flange 13, is arranged in the rear plane 18 of the breech 9 around the nozzle screw thread 11.

The flange 13 also comprises a seal, preferably in the form of an O-ring (not shown), in order to ensure a good gas-tight seal between the nozzle screw 12 and the breech 9.

After the nozzle screw 12 has been threaded in place in the breech 9, and the end piece 20 has been closed, the antitank rifle 2 is ready for firing. Loading, aiming, firing and engaging with 20 mm practice projectiles 4 are performed in the same way as when using full-calibre shells.

In order to prevent accidental firing of the training weapon 1 when the nozzle screw 12 has not yet been fitted, a safety catch 14 is arranged in the breech 9. The safety catch 14 is designed to prevent closing of the end piece 20 should the nozzle screw 12 not have been fitted in the intended place. The safety catch 14 preferably comprises a spring-loaded cotter, countersunk in the rear plane 18 of the breech 9. The cotter is pre-tensioned by a spring 15 and is moveably arranged in a cylindrical housing 16 in the rear plane 18 and projects 1-5 mm beyond the surface of the rear plane 18.

In order to cock the training weapon 1 so that the end piece 20 can be closed, the cotter must be partially pressed into its cylindrical housing 16 in the rear plane 18, to a position in which the end piece 20, in its turning movement, from the open to the closed position is not obstructed by the projecting cotter.

The training weapon 1 is cocked in that the nozzle screw 12 is fitted by being screwed into the nozzle screw thread 11 in the breech 9, so that the flange 12 presses the cotter into its cylindrical housing 16, so that the upper part of the cotter ends up flush with the lower surface 19 of the countersunk depression 17.

On opening the end piece 20 and removing the nozzle screw 12, the safety cotter springs back out to its starting position, thereby again securing the training weapon 1 against accidental firing.

The invention is not limited to the embodiments shown but can be modified in various ways without departing from the scope of the patent claims.

It will be appreciated, among other things, that the number, size, material and shape of the constituent elements and parts of the ammunition unit that are of significance for the invention, for example the barrel, breech, nozzle screw and safety catch, for example, can be modified in respect of one another and in respect of other constituent elements and parts of the ammunition unit.

The invention claimed is:

1. A training weapon system intended for a recoilless antitank rifle, the training weapon system comprising a sub-calibre barrel for firing sub-calibre practice projectiles provided with base plates, the sub-calibre barrel being arranged in a shell-like body in a barrel of the recoilless antitank rifle, a front part of the sub-calibre barrel being fitted in a guide part for centering the barrel, and a rear part of the barrel being fitted in a breech, comprising a firing channel and a nozzle screw thread for fitting a nozzle screw, which is arranged in a rear part of the shell-like body, wherein the training weapon system comprises at least one locking part, the function of which is to prevent the nozzle screw or the base plate of the projectile or part of the base plate being expelled backwards through a nozzle funnel of the antitank rifle as loose flying projectiles.

2. The training weapon system according to claim 1, wherein the locking part comprises a flange arranged on the nozzle screw and that said flange is designed, in the event of a fracture in the nozzle screw thread, to prevent the nozzle screw being released from the nozzle screw thread and being expelled backwards through the nozzle funnel of the antitank rifle as a loose flying projectile.

3. The training weapon system according to claim 2, wherein the flange is designed with an outside diameter which is greater than the inlet diameter to the nozzle funnel of the antitank rifle, in order thereby to prevent the passage of the nozzle screw.

4. The training weapon system according to claim 1, wherein the rear plane of the breech comprises a countersunk depression, the shape of which corresponds to the shape of the flange.

5. The training weapon system according to claim 1, wherein the locking part comprises a safety catch, which is arranged in the breech, the safety catch being designed to prevent closing of an end piece of the antitank rifle when the nozzle screw has not been fitted, in order thereby to prevent firing of the training weapon and hence the associated formation of loose flying splinters from the base plate of the projectile due to high back pressure.

6. The training weapon system according to claim 5, wherein the safety catch comprises a pre-tensioned cotter, the cotter being pre-tensioned by a spring and moveably arranged in a cylindrical housing countersunk in the rear plane of the breech.

7. The training weapon system according to claim 2, wherein the rear plane of the breech comprises a countersunk depression, the shape of which corresponds to the shape of the flange.

* * * * *